Figure 1:
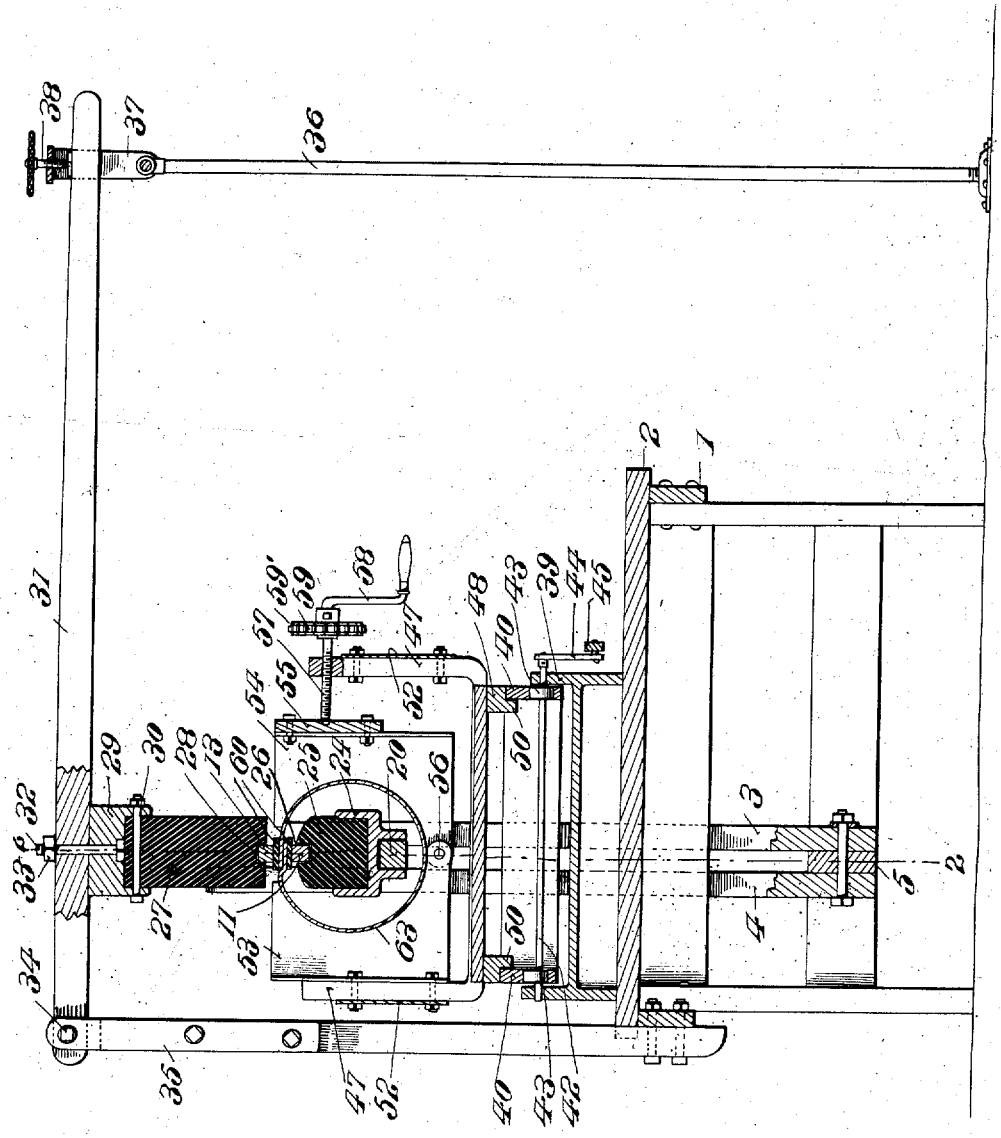

No. 853,351. PATENTED MAY 14, 1907.
W. M. FULTON.
ELECTRIC BRAZING MACHINE.
APPLICATION FILED AUG. 11, 1905.

4 SHEETS—SHEET 1.

Witnesses
Wm B Kerkam
Frederick A Hollin

Inventor
Weston M. Fulton,
By
Mauro, Cameron, Lewis & Massie,
Attorneys.

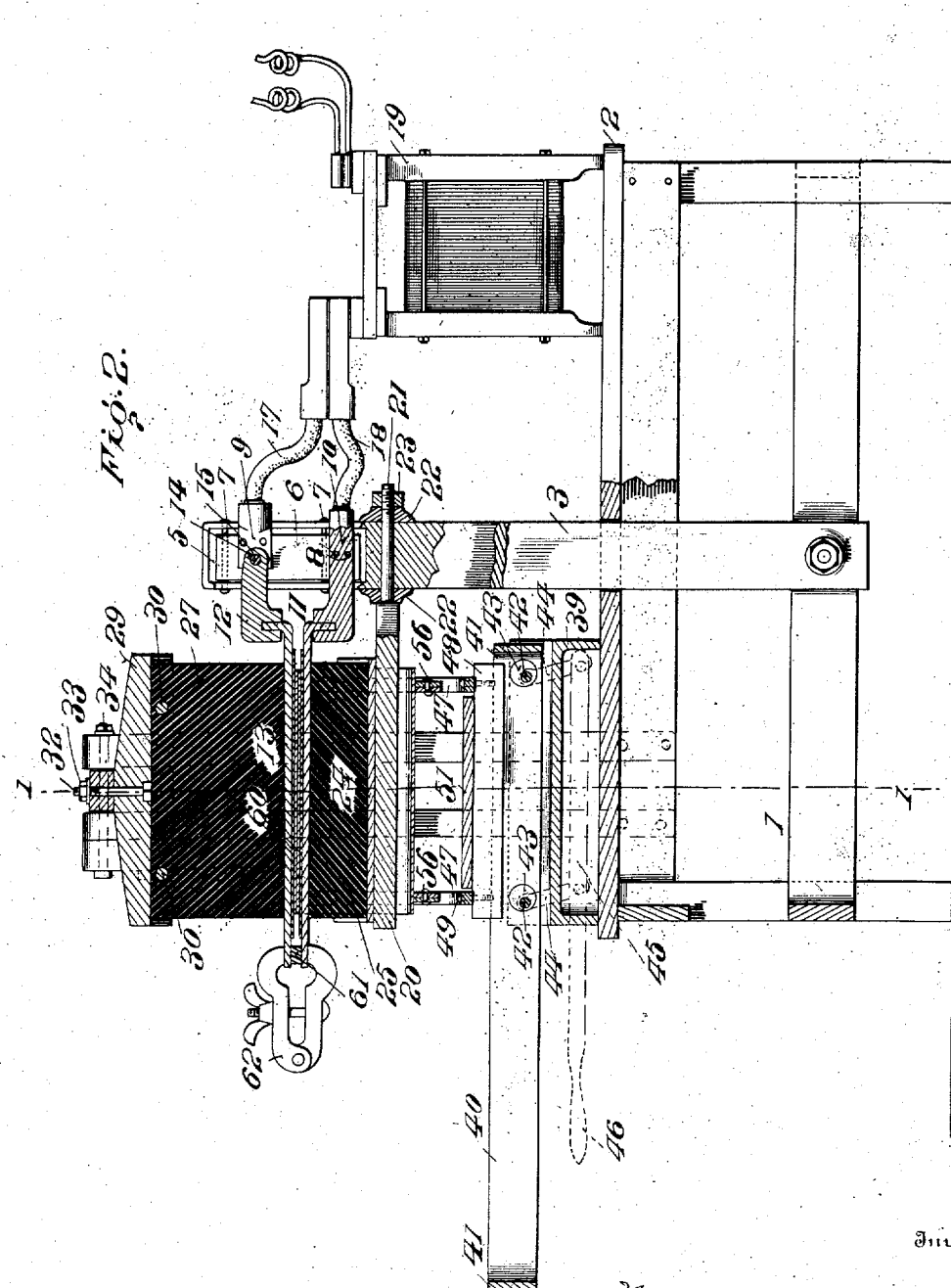

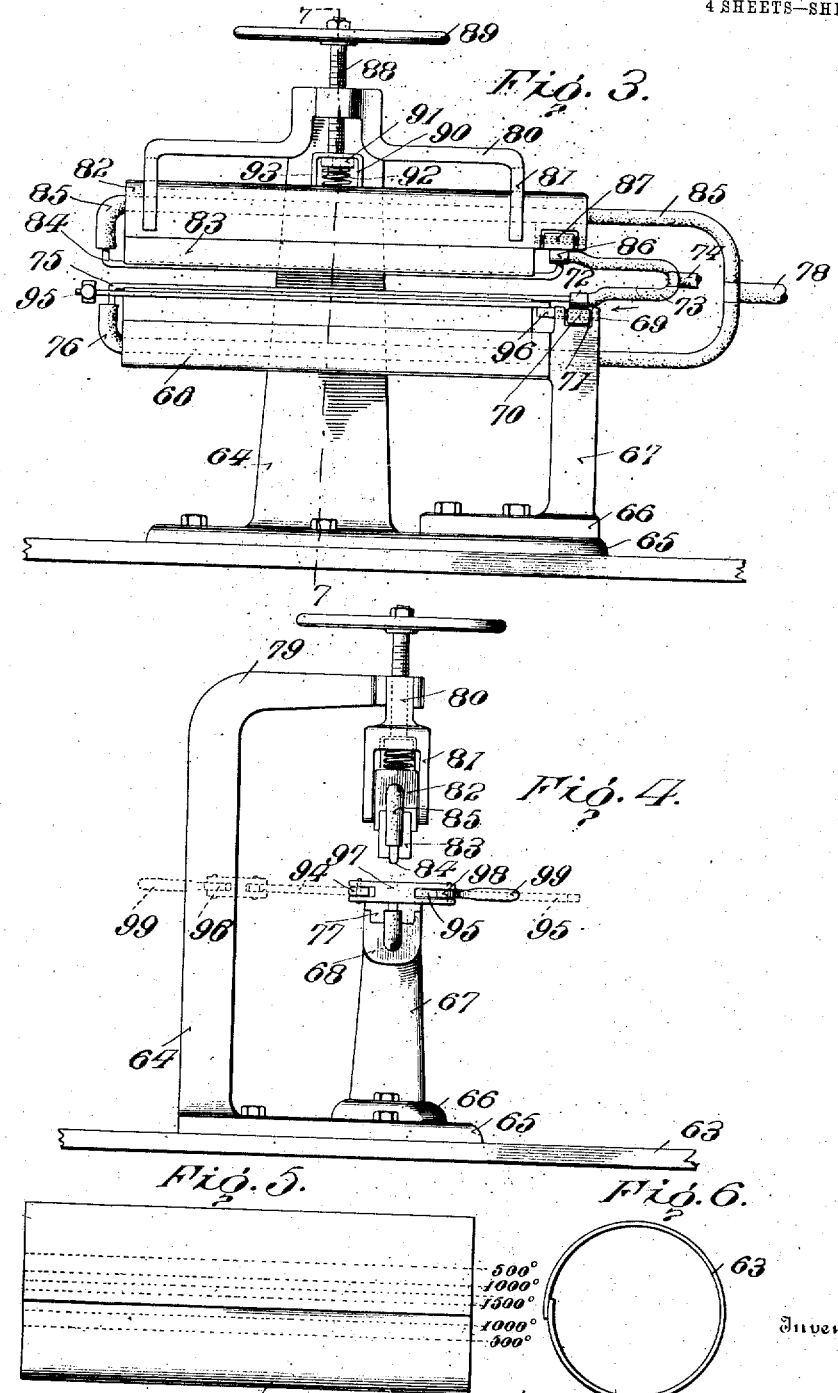

No. 853,351. PATENTED MAY 14, 1907.
W. M. FULTON.
ELECTRIC BRAZING MACHINE.
APPLICATION FILED AUG. 11, 1905.
4 SHEETS—SHEET 4.
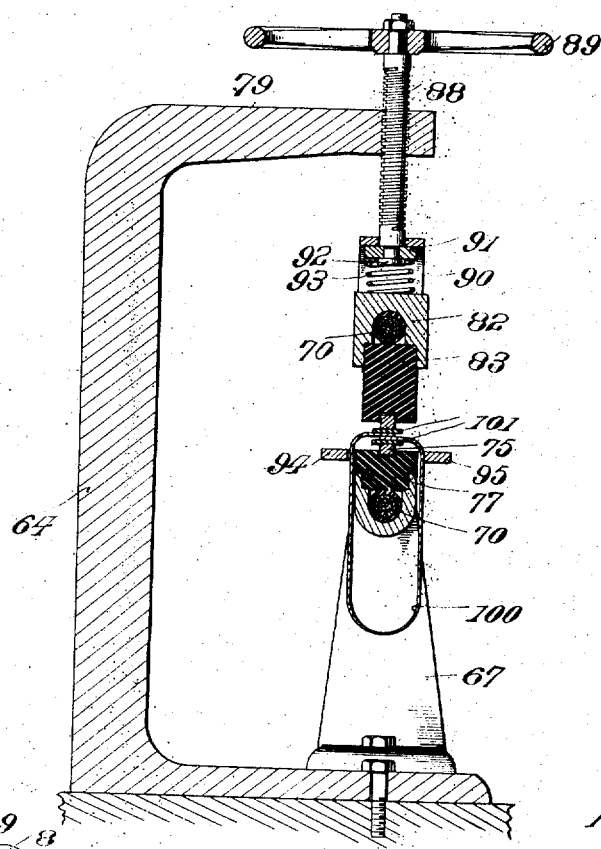
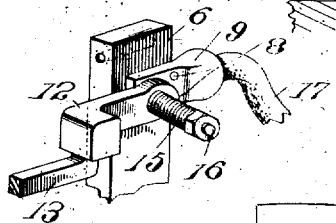
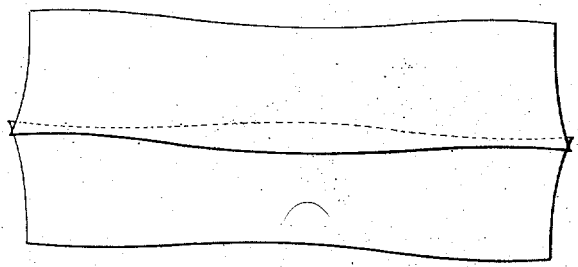
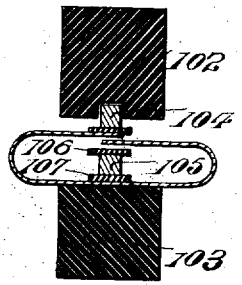
Witnesses
Wm B. Ketcham
Frederick A. Holton
Inventor
Weston M. Fulton
By
Mauro, Cameron, Lewis Massie,
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

ELECTRIC BRAZING-MACHINE.

No. 853,351.   Specification of Letters Patent.   Patented May 14, 1907.

Application filed August 11, 1905. Serial No. 273,766.

*To all whom it may concern:*

Be it known that I, WESTON M. FULTON, of Knoxville, Tennessee, have invented a new and useful Improvement in Electric Brazing-Machines, which invention is fully set forth in the following specification.

This invention relates to electrical brazing machines, and especially to those for electrically brazing tubing, but which may be used for brazing the overlapping edges of sheets or plates of metal.

In electrically brazing metal, especially in the brazing of the edges of long sheets of metal for the manufacture of tubes difficulty has been experienced in the warping of the electrically heated bars used for heating the seam; also in the displacement of the work by the longitudinal expansion of the bars and the leakage of the current over the insulating medium heretofore used for facing the heating bars. Difficulties have also been experienced especially in electrically brazing the edges of thin sheet metal to form the same into cylinders in the unequal expansion of the tube circumferentially, due to irregular heating, whereby the tube would not have a uniform cross-section when finished, and also in the unnecessary loss of heat radiated from the heating bars.

It is the object of the present invention to provide an electrical brazing machine which overcomes the above objections, and, to effect the objects of this invention, I provide an electrical brazing machine in which the overlapping edges of the metal are yieldingly pressed together between opposing heating bars, such as iron or steel, either in series circuit or in divided circuit, the heating bars being provided with means for permitting of their longitudinal expansion during heating by the current. Means, such as non-heat conducting clamping bars of fire clay, are provided for holding the heating bars yieldingly to the work, thereby effecting a concentration of heat on the seam, preventing the bars from warping and maintaining the edges of the seam in proper relation to each other.

A work-holding carriage and clamping device is also provided, into which the sheet may be introduced, then moved to the heating bars, lapped and clamped, and lowered into brazing position, thereby preventing displacement of the walls of the tube which frequently results in producing a tube of irregular cross-section. Provision is also made for preventing the current leaking from the heating bars to the metal being brazed, by interposing sheets of insulating material of a width greater than the face of the heating bar, as for example, sheets of mica, thereby retaining the current in the heating bars and at the same time securing the advantages of a thin insulating medium between the bars and the work and avoiding thick insulation which results in a loss of heating effect. A greater uniformity of heating is also secured by the use of heating bars placed on opposite sides of the seam to be brazed, and this arrangement is peculiarly useful in brazing tube seams to overcome uneven expansion and warping.

In order that the invention may be readily understood, reference is had to the accompanying drawings, which are designed merely as illustrations to assist in the description of the invention, and not in defining the limits thereof.

Figure 1 is in part an end elevation and in part a transverse vertical section through the device taken on the line 1—1, Fig. 2; Fig. 2 is in part a side elevation and in part a vertical longitudinal section on the line 2—2, Fig. 1; Figs. 3 and 4 show a side and end elevation, respectively, of a modification; Fig. 7 is a transverse vertical section on the line 7—7, Fig. 3; and Figs. 5, 6 and 8 are diagrammatic illustrations of a tube showing the effects of unequal expansion. Fig. 9 is a detail; Fig. 10 is a view showing a further modification.

Referring to Figs. 1 and 2, a table or stand 1, having a top 2, supports the working parts of the electrical brazing device. Extending upward and centrally through the top 2, of the table is a rigid standard formed of two upright members 3, 4, bolted at their lower ends a cross-brace 5, the member 3 being broke away in Fig. 2 to show the electrical connections, and elements behind the same. This standard serves to support the self-adjusting heating bar connections, and also a vertically adjustable horn, for the work. To effect this purpose the upright member 4 has at its upper end a rectangular slot 5, into which loosely fits a block 6, preferably of insulating material, such as wood, slidably supported on rods 7, and having a certain amount of play back and forth in the line of the heating bars extended. Rigidly secured to plate 6, by means of bolts 8, are electric connecting plates 9, 10, the latter of which has a slotted elbow extension for receiving and holding the lower heating bar 11. The upper connecting plate 9 is shorter and has pivoted at its end a heating bar support and connector 12, also slotted at its end and holding fast therein heating bar 13. The pivot 14, about which connector 12 oscillates, is preferably provided with a clamping means for maintaining the connector in firm electrical contact with plate 9. For this purpose the pivot 14 is extended beyond the connector 12, Fig. 9, and is provided with a stiff spring 15, which may be forced against the connector 12 by manipulation of an adjusting bolt 16 and thereby hold the connector in good electrical contact with its plate 9. Flexible cables 17 and 18 connect plates 9 and 10 with a source of current such as a transformer 19 or other current generator which it is unnecessary here to further describe. Heating bars 11 and 13 are of metal having a comparatively high resistance, such as iron, steel, nickel, or the like, and capable of withstanding a high temperature without fusing. These bars are preferably of small cross-section, and are of a length commensurate with the length of tube to be brazed. In order to protect such heating bars from undue warping during the repeated high heats to which they are subjected and to apply the heat to both sides of the seam being brazed with the least unnecessary dissipation of heat at the point of application, the following means are employed: An arm or horn 20 of rigid material, such as iron, having a reduced portion 21, is firmly held by means of clamping plates 22, 22, and nut 23, between members 3 and 4 of the upright standard, and is capable of adjustment up or down, as desired.

Mounted on horn 20 is a trough-shaped rider 24, Fig. 1, preferably of cast iron, which supports a clamp-bar 25 made of nonconducting and heat lagging material, such as well-baked fire-clay or fire clay and plumbago, the mixture being commonly designated plumbago and used for making crucibles. Clamp-bar 25 has provided in its upper side a groove 26 which is somewhat shallower than the vertical thickness of the heating bar and slightly wider, whereby provision is made for lateral expansion while the bar is at the same time prevented from warping. The upper heating bar 13 which is capable of oscillating on its pivot 14, similarly engages while in operation a heat-lagging clamp-bar 27, having a similar groove 28. Clamp-bar 27 is supported in a yoke 29, made fast therein by bolts 30, the yoke being itself attached to a lever 31 by means of a rod or bolt 32 passing through the yoke 29 and flexible lever 31, and made fast to the latter by means of a nut 33. Lever 31 is pivotally supported at 34 in an upright member 35, preferably attached to the table. The outer and free end of the lever, when the latter is in its lowered position, is subjected to a regulated pressure for which purpose a post 36, made fast to the floor, carries a stirrup 37, pivotally supported at the upper end of the post and is provided with a screw-threaded rod 38, having a suitable handle for manipulating the same, whereby the end of the rod 38 may be brought to bear on the end of lever 31 and the desired pressure applied.

In order to feed the work to the machine and prevent the same from distortion while undergoing the brazing operation, a carriage and clamping device are employed. Referring to Figs. 1 and 2, mounted on table top 2, beneath the horn 20 and heating bar 11, is a stationary frame 39, within which are mounted a pair of vertically movable ways 40 having their ends connected by brace members 41, thereby forming a carriage-supporting frame which is supported in the stationary frame 39 by means of rods 42 42 having their outer ends bearing in the sides of frame 39. Near each end of rods 42, 42 are eccentric cams 43, 43, which work in ways 40, 40 of the carriage supporting frame. Shafts 42, 42, are each provided with means for imparting thereto simultaneous movement, whereby movement imparted to the cams 43 will raise or lower the ways 40, 40 of the carriage supporting frame. For this purpose shafts 42, 42 are provided with crank arms 44, 44, which are connected by a drive-rod 45 having a handle 46. By this arrangement a thrust of drive rod 45 to the right will raise, and a reverse movement lower the ways 40.

The carriage which moves on ways 40, 40, and carries the work holding device, comprises preferably two U-shaped pieces 47, 47, secured to runners 48, by means, such as bolts 49, the runners being provided with flanges 50, and rigidly secured together by a top member 51. Side plates 52, 52, bolted to the upright members of the U-pieces 47, secure the latter together.

Mounted on the carriage are sheet iron jaws for receiving and holding the work, and means for opening and closing the same. Bolted to upright pieces 47 at one side and near each end of the movable carriage are sheet iron jaws 53 having semicircular recesses in their outer ends for receiving the tube to be brazed. Compression jaws 54, 54, fastened together as by a wooden strip 55, are hinged by pivots 56 to the lower extension of rigid jaws 53, on which pivots jaws 54 are caused to turn by means of operating-screws 57 bearing against strip 55, only one of such screws being illustrated. The extremity of screw 57, Fig. 1, is provided with a crank handle 58, and has a sprocket-wheel 59 fast thereon, over which runs a sprocket chain 59' which transmits motion to a companion screw, thereby enabling the operator to turn both screws simultaneously, whereby the clamping jaws 54 may be manipulated together.

60 are thin insulating pieces, such as sheet mica, of a width materially greater than the faces of the heating bars 11 and 13, opposite which they are placed. It is desirable that these pieces of insulating material should be very thin to permit rapid transmission of the heat from the heating-bars to the work to be brazed and of such a width that there will be no leakage of current beyond the edges of the bars.

61 is a piece of conducting metal, such as copper, interposed between the ends of the heating bars 11 and 13, and held in place by a clamp 62. This is for the purpose of completing the circuit through the heating bars by means of a low resistance connection, the clamp itself assisting in reducing the resistance at this point.

The device as thus far described operates as follows: The lever 31 is thrown up and with it the heat-lagging clamp-bar 27. Heating bar 13 is turned back on its pivotal support and the work-holding carriage, in the present instance designed to hold a tube, is drawn to the left on its ways 40, which have been moved into their raised position by the inward thrust of the drive-rod 45. The crank-handle 58 is turned to open outwardly the jaw 54 of the clamping device to receive the tube 63 which is now inserted. A strip of mica is placed on top of heating-bar 11 and the carriage pushed back to its right-hand position, thereby moving the tube over the heating-bar 11 which rests in the groove of the heat lagging clamp-bar 25. A strip of spelter, together with a flux such as borax is applied along one of the edges of the tube 63, then drive-rod 45 drawn to the left to lower the frame 40, 41 and drop the inner edge of the tube onto the lower heating-bar 11. Handle 58 is now turned to force jaw 54 to the left and thereby lay the upper edge of the tube over on top of the lower edge so as to have the edges overlap with the spelter and flux between them. A thin strip of mica is now laid on top of the overlapping upper edge and heating bar 13 is brought down on top of this insulation. Lever 31 is lowered and with it clamp-bar 27, which receives the heating-bar 13 in its groove 28, and is then locked to upright 36 by stirrups 37. Screw 38 is run down on one end of flexible lever 31 to yieldingly press the clamp-bar on to the seam to be brazed. Between the outer ends of heating bars 11 and 13 is inserted the copper block 61 approximately of the combined thickness of the heating bars and insulation and held in place by clamp 62.

The electric current, which is preferably an alternating one, is turned on and for any particular instant may be assumed to enter at cable 17 and take its course through 12, 13, 61, 11, 10 and 18 back to its source. The current meets its greatest resistance in the heating bars to which it is completely confined by reason of the wide insulating strips of mica, which, by reason of its edges extending materially beyond the faces of the heating-bars, enables the latter to retain the current without leakage. As the bars heat up to the desired temperature the following occurs: The heating-bars expand laterally and longitudinally, which, if not provided for, would result in warping the bars and displacing the parts. The heating-bars are kept straight by means of the retaining grooves in the heat-lagging clamp-bars 25 and 27, which, at the same time, by reason of their low heat conductivity, prevent loss of heat to parts not desired. Longitudinal expansion of the bars, which, if restrained, particularly at the ends, gives rise to displacement, is taken up by means of the block 6 to which the bars are attached, and which adjusts itself to the various amounts of expansion and contraction by moving on its supports 7, 7.

The gradual transfer of heat through the mica insulation gradually melts the flux and spelter, and, together with the expansion of the metal, tends to displace the parts. To overcome this objection, clamp-bar 27 is caused to exert a yielding or spring-pressure upon the seam by means of the long elastic lever-arm 31, to thereby follow these irregularities during brazing and maintain a uniform pressure at all times. When the heating is completed the current is turned off, the tube cooled and removed.

By using two heating-bars, as above described, heat is applied to both sides of the seam, thereby effecting the uniform heating of the seam through and through, while, in the case of the bar within the tube, the latter acts as a hood to prevent loss of heat by radiation.

Figs. 5, 6 and 8 show diagrammatically the distribution of temperature along the heated edges of the tube beneath the heating-bars and the effects of expansion of the metal along the lines of the seam. Fig. 5 shows that the maximum temperature is at the middle of the seam and grades off on each side away from the seam. As a result of this unequal distribution of heat around the circumference of the tube the overlapping edges of the tube have a tendency to spread out into a fan-shape, and become curved, as shown in Fig. 8, into a tube narrower at its central portion than at its ends. In order that this defect may be overcome the clamping jaws 53 and 54 have been provided on the carriage to hold the tube rigidly around its periphery at both ends and prevent spreading. The jaws are made thin to avoid loss of heat by conduction where they come in contact with the tube.

In Figs. 3, 4 and 7, is illustrated a modification of the above invention, in which 63 is a base or support to which the frame of the machine may be securely bolted. 64 is a cast-iron frame having a flat base 65, to one side of which is bolted the foot 66 of a post 67, from which projects a horn 68 which may, when very long, be provided with a hinged end support, and in the top of which post is an opening 69. Mounted in opening 69 is a block 70 of insulating material freely movable on rods 71, and performing the same function as block 6, Fig. 2. On block 70 is mounted a metal connector 72, such as copper, to which a branch 73 of a secondary terminal 74 from a transformer is attached. 75 is a heating-bar, such as above described, extending from connector 72, having its extremity in metallic contact with cable 76, passing through horn 68 to the other secondary terminal 78 of the transformer. In the upper part of the horn is a slot in which rests a heat-lagging clamp-bar 77, preferably made of fire-clay or plumbago, and in which is a narrow channel for receiving the heating-bar 75. Extending laterally from the top of post 64 is an extension 79, carrying at its extremity arms 80, having forks 81, in which moves a yoke 82 for holding a heat-lagging clamp-bar 83, in the lower face of which is a channel for holding the upper heating bar 84, one end of which is connected to a cable 85 passing through the yoke 82 leading to terminal 78. The opposite end of bar 84 is connected with a connector 86 mounted on a sliding block 87 carried by yoke 82 and is similar to block 70 above described. Engaging a threaded opening in the extension 79 is a support screw 88, provided at its upper end with a hand-wheel 89, its lower end loose in an opening in frame 90 and having thereon a follow-block 91 retained by a nut 92 or like means. Within frame 90, which is fast to yoke 82, is a spring 93 held between follow-block 91 and the top of the yoke, whereby a yielding pressure may be applied to the yoke through the agency of screw 88.

For the purpose of retaining the edges of the sheet metal from relative movement during the brazing operation, a side clamping device is provided comprising a pair of steel bars 94, 95, hinged on lugs 96 at the upper part of standard 67, and having at their free ends a locking means, such as link 97 made of conducting or non-conducting material, such as metal or wood pivoted to the extremity of one of the bars 94 and having at its opposite end a slot carrying an eccentric cam 98, provided with a handle 99, whereby the cam may be turned down on the end of bar 95 and thereby force the bars against the work on the heat-lagging clamp-bar.

The operation of this device is similar to that first described, but differs in the following respects, and operates in the following manner:—The hand-wheel 89 is turned to raise the upper yoke 82 in the guides or forks 81, and, with it, the upper heating-bar 84. The side-clamp-bars 94 and 95 are thrown aside and the work, such as a tube or similar body 100, previously bent out of true cylindrical form, is placed with its lapping edges over the lower heating bar 75 on which is a sheet of insulating material 101 of a width greater than that of the bar, as previously explained. The side-bars 94 and 95 are brought against the sides of the tube to prevent spreading and their ends clamped together by means of the link 97 and cam 98. The spelter and flux having been applied and the insulating sheets 101 placed in position, the upper heating-bar is lowered by turning handle 89, and, when the heating-bar rests on the work, a yielding pressure is applied thereto through the agency of spring 93 by further traverse of the screw 88. The heating-bars, it will be noted, are not in series, as in the device illustrated in Figs. 1 and 2, but are placed in a divided circuit, thereby enabling the heating bars to be separated without breaking the electric circuit. Free longitudinal expansion of the heating bars is provided for by means of the sliding blocks 70, 87, at one end and the flexible cable connections at the opposite ends.

In Fig. 10 is illustrated a modified arrangement which peculiarly lends itself to brazing tubes of small diameter and overcomes the tendency of the tubes to warp under the extreme difference of temperature between the seam and those portions of the tube opposite the seam, as fully explained in connection with Figs. 5, 6 and 8. In this modified construction 102, 103 are the yieldingly disposed heat-lagging clamp-bars, the upper one only of which is provided with a groove for receiving the heating-bar 104. The heating bar 105 is within the tube and is insulated from the same by two sheets of insulating material 106, 107, the former separating the upper face of the bar from the seam, and the latter interposed between the lower face of the bar and the inner wall of the tube in which the heating-bar and insulation rest. The clamp-bar 103 in this construction directly rests against the bottom of the tube to be welded. A strip of mica or other insulating material is interposed between the upper heating-bar and the seam, and each strip or piece of insulation has an area greater than that of the face of the heating bar against which it rests.

The heating-bars are preferably connected to a source of alternating current in the manner indicated in Figs. 1 and 2, and have between their opposite ends a block of copper, and the whole secured by a clamp, as above described.

The tube to be brazed, which is somewhat larger than the brazing-bar, is bent into a more or less elliptical shape, as indicated in Fig. 10, with its edges over-lapped with flux and spelter interposed, and the insulations interposed both between the bars and seam, and also the lower heating-bar and the wall of the tube. The bars are then brought together with a yielding pressure and the current turned on to heat the bars and fuse the flux and spelter, after which the parts are cooled, the tube removed and pressed into its desired shape over a mandrel.

It will be here noted that the lower heating-bar imparts heat both to the seam and also through the lower insulation to the part of the tube diametrically opposite the seam, thereby overcoming the tendency to distortion by setting up an opposing set of expansion lines to those about the seam. and thereby causing a more uniform expansion of the tube and avoiding distortion.

What is claimed is:—

1. In an electric brazing machine, the combination of a heating bar and a self-adjusting support for one end of the same, to respond to expansion and contraction of said heating bar.

2. In an electric brazing machine, the combination of heating bars, yieldingly pressed clamping means for said bars, insulating means opposite the faces of said bars, and self-adjusting end supports for said bars.

3. In an electric brazing machine, the combination of heating bars, heat lagging clamp-bars retaining said heating bars, and means applying a yielding pressure to one of said bars.

4. In an electric brazing machine, the combination of heating-bars, heat-lagging clamp-bars having retaining grooves for said heating bars, and self-adjusting end supports for said latter bars.

5. In an electric brazing machine, the combination of heating bars, heat-lagging clamp-bars resting against and retaining said heating-bars to hold the latter against the seam to be welded, and work-clamping means for rigidly holding the work.

6. In an electric brazing machine, the combination of heating bars, one of which is stationary, a work-carrier movable in line with and under said stationary bar, a supporting frame for said carrier provided with raising and lowering means for the same, and a work-clamping device on said carrier.

7. In an electric brazing machine, the combination of a pair of heating bars, a movable support fast to the end of one bar and pivotally connected to one end of the other bar, and yieldingly pressed heat-lagging clamp-bars for holding the heating-bars against their work.

8. In an electric brazing machine, the combination of a pair of heating bars, one movable and one fixed, heat-lagging clamp-bars on one of which said fixed heating bar rests and a horn for supporting said clamp-bar, a carriage movable in line with and under said heating-bar, work-clamping jaws on said carriage, and operating means for said clamping jaws.

9. In an electric brazing machine, the combination of oppositely disposed heating-bars, heat-lagging clamping-bars each having a groove for receiving a heating-bar, a horn for supporting one of said clamping-bars, means for raising and lowering the other of said clamping-bars, and means for applying a yielding pressure to said movable bar.

10. In an electric brazing machine, the combination of heating-bars, a carriage movable in line with and under said bars, and tube clamping jaws on said carriage, and opening and closing means for the jaws.

11. In an electric brazing machine, the combination of two seam heating bars, a self-adjusting supporting member for said bars, one of said bars being fast to said member and the other having a spring-pressed pivotal connection therewith, and yieldingly pressed heat-lagging clamp-bars for holding the said heating bars against their work.

12. In an electric brazing machine, the combination of two seam heating bars, a self-adjusting supporting member for said bars, one of said bars being fast to said member and the other having a pivotal connection therewith, two heat-lagging clamp-bars each having a groove for receiving a heating bar, an adjustable horn for supporting one of said heating bars, and a yieldingly pressed pivotal supporting means for the other of said clamp bars, and circuit closing means for the free ends of said heating bars.

13. In an electric brazing machine, the combination of two seam heating bars, one of which is movable and the other stationary, a work-holding carriage movable in line with and beneath said stationary bar, carriage ways provided with means for raising and lowering the same, tube clamping jaws on said carriage, and opening and closing means for said jaws.

14. In an electric brazing machine, the combination of two seam heating bars, one of which is movable relatively to the other, two heat-lagging clamp-bars one of which is stationary and the other movable for pressing said heating bars against the work to be welded, and a horn having a saddle for receiving said stationary clamp-bar.

15. In an electric brazing machine, the combination of a heating-bar and means for maintaining said bar in alinement during the passage therethrough of an electric current.

16. In an electric brazing machine, the combination of a heating-bar and heat-lagging means for maintaining said bar in alinement during the passage therethrough of an electric current.

17. In an electric brazing machine, the combination of a heating bar, a heat-lagging clamp bar retaining said bar in alinement under the action of the heating current, and self-adjusting means connecting said bar with a source of current.

18. In an electric brazing machine, the combination of a heating-bar and self-adjusting means responding to the expansion and contraction of said bar and connecting said bar with a source of electric current.

19. In an electric brazing machine, a seam heating-bar having both ends free to move when the bar is subjected to a heating current.

In testimony whereof I have signed this specification in the presence of two subscribing witnesses.

WESTON M. FULTON.

Witnesses:
E. J. HYATT,
JNO. P. RHEA.